United States Patent [19]

Sano et al.

[11] 4,223,117

[45] Sep. 16, 1980

[54] PROCESS FOR PRODUCING OLEFIN POLYMERS

[75] Inventors: Takezo Sano, Takatsuki; Akio Kobayashi, Suita; Yasuharu Yamada, Takatsuki, all of Japan

[73] Assignee: Sumitomo Chemical Company, Limited, Osaka, Japan

[21] Appl. No.: 894,841

[22] Filed: Apr. 10, 1978

Related U.S. Application Data

[63] Continuation of Ser. No. 750,155, Dec. 13, 1976, abandoned.

[30] Foreign Application Priority Data

Dec. 18, 1975 [JP] Japan ................ 50-151571
Dec. 18, 1975 [JP] Japan ................ 50-151572
Dec. 18, 1975 [JP] Japan ................ 50-151573

[51] Int. Cl.$^2$ .................... C08F 4/02; C08F 10/00
[52] U.S. Cl. .................... 526/121; 252/429 B; 252/429 C; 252/431 R; 526/122; 526/124; 526/125; 526/127; 526/128; 526/139; 526/141; 526/142; 526/151; 526/156; 526/348; 526/351; 526/352
[58] Field of Search .......... 252/429 B, 429 C, 121, 252/124, 127, 128, 151, 156, 431 R; 526/142

[56] References Cited

U.S. PATENT DOCUMENTS

| | | | |
|---|---|---|---|
| 3,718,636 | 2/1973 | Stevens et al. | 526/124 |
| 3,819,599 | 6/1974 | Fotes et al. | 526/124 |
| 3,833,515 | 9/1974 | Amtmann et al. | 526/124 |
| 3,888,835 | 6/1975 | Ito et al. | 526/125 |
| 3,901,863 | 8/1975 | Berger et al. | 526/124 |
| 3,917,575 | 11/1975 | Matsuura et al. | 526/151 |
| 4,115,319 | 9/1978 | Scata et al. | 526/142 |

FOREIGN PATENT DOCUMENTS

| | | | |
|---|---|---|---|
| 2324766 | 1/1974 | Fed. Rep. of Germany | 526/125 |
| 2455415 | 5/1975 | Fed. Rep. of Germany | 526/125 |
| 2517567 | 10/1975 | Fed. Rep. of Germany | 526/151 |
| 1286867 | 8/1972 | United Kingdom | 526/125 |
| 1292853 | 10/1972 | United Kingdom | 526/125 |
| 1305610 | 2/1973 | United Kingdom | 526/125 |

OTHER PUBLICATIONS

Mole, et al., Organoluminium Compounds, Elsevin Publ. Co. N.Y., (1972), pp. 88–89.

Primary Examiner—Edward J. Smith
Attorney, Agent, or Firm—Stevens, Davis, Miller & Mosher

[57] ABSTRACT

A process for the polymerization of olefins in the presence of a catalyst comprising a titanium compound and/or vanadium compound supported on a solid carrier and an organoaluminum compound, characterized in that said solid carrier comprises a solid product obtained by the reaction of an organomagnesium compound or a reaction mixture resulting from the organomagnesium compound and at least one compound selected from the group consisting of magnesium hydroxide, calcium hydroxide, zinc hydroxide and aluminum hydroxide, with an aluminum halogenide and/or silicon halogenide, whereby there are produced olefine polymers in an extremely large amount per unit weight of catalyst.

11 Claims, No Drawings

PROCESS FOR PRODUCING OLEFIN POLYMERS

This is a continuation of application Ser. No. 750,155, filed Dec. 13, 1976 now abandoned.

The present invention relates to a process for the polymerization (including co-polymerization hereinafter) of olefins with a catalyst of high activity. More particularly, it relates to a process for the polymerization of olefins in the presence of a catalyst comprising a titanium compound and/or vanadium compound supported on a solid carrier and an organoaluminum compound, characterized in that said solid carrier comprises a solid product obtained by the reaction of an organomagnesium compound or a reaction mixture resulting from the organomagnesium compound and at least one compound selected from the group consisting of magnesium hydroxide, calcium hydroxide, zinc hydroxide and aluminum hydroxide, with an aluminum halogenide and/or silicon halogenide.

Hitherto, the well-known catalysts effective for the polymerization of olefins are the so-called Ziegler-Natta catalyst which comprises combining the compounds of the transition metals belonging to Groups IV$b$ to VI$b$ of Periodic Table and the organo-compounds of the metals belonging to Groups I to III of Periodic Table.

Further, many studies were made on the catalysts comprising a carrier and the compound of the transition metal supported thereon, and it was found that inorganic compounds such as oxides, hydroxides, chlorides or carbonates of metals or silicon, mixtures and complexes thereof are useful as a carrier.

For example, there are disclosed magnesium oxide, titanium oxide and alumina silica (Belgian Pat. No. 759,601); magnesium carbonate (Japanese Patent Publication No. 30,832/1970); hydroxychlorides of divalent metals (Japanese Pat. Publication Nos. 13,050/1968, 15,826/1968 and 9,548/1970); magnesium hydroxide (Japanese Pat. Publication No. 40,295/1970); magnesium chloride (Japanese Pat. Publication Nos. 46,2969/1972 and 41,676/1972 and French Pat. No. 178,330/1968); complex oxides of magnesium and aluminum (Japanese Pat. Publication No. 26,383/1972); and complex oxides of magnesium and calcium (Japanese Pat. Publication (unexamined) No. 14,349/1974). Further, Japanese Pat. Publication No. 43,435/1972 discloses a solid carrier prepared by treating the solid compound of a divalent metal with an organoaluminum compound or organomagnesium compound.

These solid carriers require a pre-treatment, in general, for example pulverization by ball mills or activation by calcination. It is therefore very difficult to control the particle size of solid carrier. Further, catalysts comprising titanium compounds and/or vanadium compounds supported on these solid carriers have a low catalytic activity and only produce polymers of bad slurry state.

The inventors extensively studied a process for the polymerization of olefins having a high catalytic activity and industrial advantage, and it was found that catalysts comprising combining an organoaluminum compound with a titanium compound and/or vanadium compound supported on a solid product have extremely high activity as a catalyst for the polymerization of olefins, said solid product being prepared by the reaction of an organomagnesium compound or a reaction mixture resulting from the organomagnesium compound and at least one compound selected from the group consisting of magnesium hydroxide, calcium hydroxide, zinc hydroxide and aluminum hydroxide, with an aluminum halogenide and/or silicon halogenide. The present invention is based on this finding.

An object of the present invention is to provide an improved process for the polymerization of olefins by which polyolefins of extremely large amount per unit weight of catalyst can be obtained. These and other objects and advantages of the invention will be apparent from the following description.

According to the present invention, the yield of polymer per unit weight of transition metal is so large that there is no need to remove the residual catalyst from the polymer after polymerization. Further, when the polymerization is carried out in a slurry state, the course during which the polymer is produced is smooth and good, and the produced polymer hardly adheres to the polymerization vessel. Consequently, the method of the present invention is very useful from the industrial point of view.

Furthermore, the catalysts used in the present invention exhibit a very high catalytic activity not only in the polymerization in a sluury state but also in the solution polymerization at high temperatures.

The characteristics of the present invention will be illustrated in detail hereinafter.

The organomagnesium compounds used for synthesis of the present catalysts have the following general formula, $R^1MgX$, wherein $R^1$ is an alkyl group having 1 to 20 carbon atoms, aryl or alkenyl group and X is a halogen atom.

They are often used in a narrow sense as etherified Grignard compounds. In the present invention, however, the organomagnesium compounds are used in the broadest sense as those having an optional form which are produced by the reaction of alkyl halides ($R^1X$) and metallic magnesium (Mg).

In other words, the organomagnesium compounds of the present invention include any composition constituting the following equilibrium,

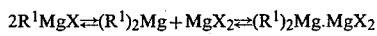

whether or not they are prepared in the presence of ether [W. Shlenk et al., Jr. Ber. 62, 920 (1929); Jr. Ber. 64, 739 (1931)].

Specifically, $R^1$ includes an alkyl group having 1 to 20 carbon atoms (e.g. methyl, ethyl, n-propyl, isopropyl, n-butyl, sec-butyl, tert-butyl, n-amyl, iso-amyl, n-hexyl, n-octyl, 2-ethylhexyl), and an aryl group (e.g. phenyl, benzyl); and X includes a chlorine, bromine and iodine atom.

As the specific examples of the organomagnesium compound, there are exemplified alkylmagnesium halides (e.g., ethylmagnesium chloride, ethylmagnesium bromide, n-propylmagnesium chloride, n-butylmagnesium chloride, tert-butylmagnesium chloride, n-amylmagnesium chloride, phenylmagnesium bromide) and the compositions at equilibrium represented by the formula, $(R^1)_2Mg \cdot MgX_2$.

Further, the dialkylmagnesium compounds of the formula, $(R^1)_2Mg$, are also included in the scope of the present organomagnesium compounds, as shown in the equilibrium formula described above. The specific examples of the dialkylmagnesium compound include diethylmagnesium, dipropylmagnesium, dibutylmagnesium, diamylmagnesium, dihexylmagnesium, dioctylmagnesium, diphenylmagnesium, dibenzylmagnesium and the like.

Furthermore, the organomagnesium compounds of the formula, $R^1Mg(OR^2)$, wherein $R^1$ is as defined above, and $R^2$ is an alkyl group having 1 to 20 carbon atoms (e.g. methyl, ethyl, n-propyl, iso-propyl, n-butyl, sec-butyl, tert-butyl, n-amyl, iso-amyl, n-hexyl, n-octyl, n-decyl), aryl group (e.g. phenyl, benzyl) or alkenyl group (e.g. allyl), are included in the scope of the present organomagnesium compounds.

These organomagnesium compounds are synthesized in the presence of an ethereal solvent (e.g. ethyl ether, propyl ether, butyl ether, amyl ether, tetrahydrofuran, dioxane), or a hydrocarbon solvent (e.g. hexane, heptane, octane, cyclohexane, benzene, toluene, xylene).

The hydroxides of magnesium, calcium, zinc and aluminum used in the reaction with the organomagnesium compounds include a compound having at least one metalhydroxyl group linkage (M—OH wherein M is a metal). In other words, said hydroxides include the hydroxides of the formula, $M(OH)_mL_l$, wherein M is a magnesium, calcium, zinc or aluminum metal, m is a number of 1 or more, L is an anion, and the total number, m+l, equals to the valence of the metal, M, in addition to magnesium hydroxide, calcium hydroxide, zinc hydroxide and aluminum hydroxide.

Specifically, there may be exemplified $Mg(OH)Cl$, $Mg(OH)Br$, $Ca(OH)Cl$, $Zn(OH)Cl$, $Al(OH)_2Cl$, $Al(OH)Cl_2$ and the like.

The aluminum halogenides of the formula, $(R^3)_nAlX_{3-n}$, include all the compounds having an aluminum-halogen linkage (Al—X). The silicon halogenides of the formula, $(R^4)_mSiX_{4-m}$, include all the compounds having a siliconhalogen linkage (Si—X). In the foregoing general formulae, $R^3$ and $R^4$ are each an alkyl group having 1 to 20 carbon atoms, cycloalkyl, aryl or alkenyl group, and specifically they are methyl, ethyl, n-propyl, iso-propyl, n-butyl, sec-butyl, tert-butyl, n-amyl, iso-amyl, n-hexyl, n-heptyl, n-octyl, vinyl, allyl, cyclopentyl, cyclohexyl, phenyl or benzyl; X is a halogen atom such as a chlorine, bromine or iodine atom; n is a number satisfying the formula, $0 \leq n < 3$; and m is a number satisfying the formula, $0 \leq m < 4$.

As the specific examples of the aluminum halogenide, there may be exemplified aluminum chloride, aluminum bromide, aluminum iodide, diethylaluminum chloride, ethylaluminum dichloride, ethylaluminum sesquichloride, dibutylaluminum chloride, butylaluminum dichloride, dihexylaluminum bromide, hexylaluminum dibromide and the like. As the specific examples of the silicon halogenide, there may be exemplified silicon tetrachloride, silicon tetrabromide, methylsilyl trichloride, dimethylsilyl dichloride, trimethylsilyl chloride, ethylsilyl trichloride, diethylsilyl dichloride, triethylsilyl chloride, propylsilyl tribromide, dipropylsilyl dibromide, tripropylsilyl bromide, butylsilyl trichloride, dibutylsilyl dichloride, tributylsilyl chloride, vinylsilyl trichloride and the like.

Among these aluminum halogenides and silicon halogenides, the larger the number of halogen atoms is, the better the results become. Consequently, aluminum chloride and silicon tetrachloride are most preferred.

On the other hand, as the titanium compounds and vanadium compounds supported on carriers, there may be exemplified titanium tetrachloride, titanium tetrabromide, titanium tetraiodide, titanium trichloride, alkoxytitanium halides of the formula, $Ti(OR^5)_{4-p}X_p$, vanadium tetrachloride, oxyvanadium trichloride and the like. As the specific examples of the titanium compound of the formula, $Ti(OR^5)_{r-p}X_p$, wherein $R_5$ is an alkyl group having 1 to 20 carbon atoms, cycloalkyl or phenyl group; X is a halogen atom; and p is a number satisfying the formula, $0 \leq p \leq 4$, there may be exemplified ethoxytitanium trichloride, diethoxytitanium dichloride, triethoxytitanium chloride, propoxytitanium trichloride, butoxytitanium trichloride, phenoxytitanium trichloride, ethoxytitanium tribromide, dipropoxytitanium dibromide, tributoxytitanium bromide and the like.

The synthetic reaction of catalyst should always be carried out in the atmosphere of an inert gas such as nitrogen or argon. This reaction is carried out as follows: The hydroxide of magnesium, calcium, zinc or aluminum is suspended or dissolved in a solvent and the organomagnesium compound is added thereto with stirring. Next, the aluminum halogenide and/or silicon halogenide is further added thereto with continuous stirring. Alternatively, the reaction may be carried out by mixing the organomagnesium compound and the aluminum halogenide and/or silicon halogenide in a solvent with stirring, or by adding the organomagnesium compound to the aluminum halogenide and/or silicon halogenide suspended or dissolved in a solvent with stirring.

The reaction of the organomagnesium compound with the hydroxide of magnesium, calcium, zinc or aluminum is carried out at $-20°$ to $200°$ C., preferably $0°$ to $100°$ C., in a solvent with stirring. Further, the reaction of the organomagnesium compound with the aluminum halogenide and/or silicon halogenide is carried out at $-20°$ C. to $200°$ C., preferably $-20°$ to $100°$ C., in a solvent with a stirring.

As the solvents used for the reaction, there may be exemplified aliphatic hydrocarbons (e.g. pentane, hexane, heptane, octane), aromatic hydrocarbons (e.g. benzene, toluene, xylene), alicyclic hydrocarbons (e.g. cyclohexane, cyclopentane) and ethereal solvents (e.g. ethyl ether, propyl ether, butyl ether, iso-amyl ether, hexyl ether, octyl ether, tetrahydrofuran, dioxane). Among these solvents, the ethereal solvents are particularly preferred. Further, among the ethereal solvents, ethyl ether and iso-amyl ether give the best results.

In the reaction of the hydroxide of magnesium, calcium, zinc or aluminum with the organomagnesium compound, the molar ratio, the hydroxide/the organomagnesium compound, is within the range of 0.01/1 to 10/1, preferably 0.1/1 to 1.0/1. In the reaction of the organomagnesium compound with the aluminum halogenide and/or silicon halogenide, the molar ratio, the organomagnesium compound/the halide, is within the range of 0.1/1 to 10/1, preferably 1.0/1 to 5.0/1. The reaction products are filtered and dried as they are or after thoroughly washed with a purified hydrocarbon diluent. The dried products can be used as a carrier. This solid carrier has extremely a large surface area so that it does not particularly require activation treatments such as pulverization by means of ball mills or calcination. Further, this solid carrier has a good particle size distribution.

The solid products resulting from the reaction of the organomagnesium compounds with the aluminum halogenides and/or silicon halogenides have a crystal structure in general, but they sometimes show broad diffraction patterns showing an amorphous structure. The solid products have different X-ray diffraction patterns from those of anhydrous magnesium halogenides, which is probably due to the presence of complex halogenides containing aluminum and/or silicon and magnesium. When the above-described reaction is carried out in the ethereal solvent, the solid products obtained contain the ether compound used as solvent. This adsorbed ether compound can not completely be removed by the physical operations such as drying under reduced pressure. These products are dried under reduced pressure at room temperature to obtain solvented compounds which are preferably used as a carrier. Alternatively, these products may be calcined prior to use.

Next, the titanium compound and/or vanadium compound are supported on the carriers thus synthesized by the well-known methods such as impregnation or kneading. For example, the titanium compound and/or vanadium compound are brought into contact with the carrier without solvent or in a suitable inert solvent. Alternatively, the carrier and the titanium compound and/or vanadium compound of liquid or solid form may be copulverized in a ball mill. These supporting treatments are preferably carried out at $-20°$ to $150°$ C.

The resulting products, the carrier plus the titanium compound and/or vanadium compound supported thereon, are filtered, thoroughly washed with a purified hydrocarbon diluent, and used as they are or after drying. The amount of the titanium compound and/or vanadium compound to be supported on the carrier is generally 0.01 to 30% by weight, particularly preferably 0.1 to 15% by weight in terms of titanium and/or vanadium based on the said solid products.

On the other hand, the organoaluminum compounds, which are a component constituting the catalyst system for polymerization together with the above-described solid products (solid catalyst component), are those represented by the formula, $Al(R^6)_nX_{3-n}$, wherein $R^6$ is a hydrocarbon group having 1 to 10 carbon atoms, X is a chlorine, bromine or iodine atom and n is an integer satisfying the formula, $0 < n \leq 3$.

For example, they include trialkylaluminum compounds (e.g. triethylaluminum, tri-n-propylaluminum, tri-n-butylaluminum, tri-n-hexylaluminum), dialkylaluminum monohalides (e.g. diethylaluminum monochloride, di-n-propylaluminum monochloride, di-n-butylaluminum monochloride, di-n-hexylaluminum monochloride), alkylaluminum dihalides (e.g. ethylaluminum dichloride, n-propylaluminum dichloride, n-butylaluminum dichloride, n-hexylaluminum dichloride), and alkylaluminum sesquihalides (e.g. ethylaluminum sesquichloride, n-propylaluminum sesquichloride, n-butylaluminum sesquichloride, n-hexylaluminum sesquichloride). Among these compounds, trialkylaluminum is most preferred. These organoaluminum compounds may be used alone or in combination.

The molar ratio (Ti and/or V:Al) of the solid catalyst component and the organoaluminum compound used for the polymerization of olefins can vary widely from about 10:1 to 1:1000, preferably from 2:1 to 1:100.

As the olefins used in the present invention, there may be exemplified olefins having 2 to 15 carbon atoms, for example ethylene, propylene, butene-1, 4-methylpentene-1, hexene-1, styrene, and the like. Further, mixtures of the olefin and a small amount of dienes (e.g. butadiene, vinylcyclohexene, divinylbenzene) may be used. Particularly, as the monomers used for the polymerization, there are principally used ethylene itself, propylene, butene-1 and mixtures of ethylene and other olefins (e.g. propylene, butene-1) or dienes (e.g. butadiene).

The polymerization procedure is not largely different from those of ordinary slurry polymerization, bulk polymerization and solution polymerization. That is, the procedure is preferably carried out as follows: The foregoing solid catalyst component and organoaluminum compound are mixed in an inert solvent and the olefin is continuously supplied to the mixture at a reaction temperature from room temperature to 200° C. and under a reaction pressure from atmospheric pressure to 100 atm. The reaction temperature and reaction pressure are not however limited to these ranges and further high levels may be used. And, for example hydrogen may be used as a molecular weight controlling agent.

Further, by adding to the polymerization system, an electron donor compound known as third component of the catalysts, the stereoregularity of olefin polymers (e.g. polypropylene, polybutene-1) obtained may be improved. The electron donor compound is preferably a compound having N, O or P atom in the molecule such as an ether, ketone, ester, amine or phosphorus compound. Suitable examples of the electron donor compounds are n-butyl ether, iso-amyl ether, di-phenyl ether, tetrahydrofuran, dioxane, acetone, acetophenone, benzophenone, acetyl acetone, pyridine, triethyl amine, hexamethyl phosphoric triamide (HMPA), etc.

As the inert solvents used as a solvent for polymerization, there may be exemplified aliphatic hydrocarbons (e.g. pentane, hexane, heptane, octane), alicyclic hydrocarbons (e.g. cyclohexane, cycloheptane) and aromatic hydrocarbons (e.g. benzene, toluene, xylene).

The catalysts used in the present invention have extremely high activity and the yield of the polymer amounts to 500,000 to 1,000,000 parts per unit part of transition metal. As extremely highly active catalysts have a catalytic activity of more than 1,000,000 parts polymer per unit part of catalyst, removal of the ash in the polymer is not necessary after polymerization. Therefore, they are very useful industrially.

The present invention will be illustrated in more detail with reference to the following examples. The present invention is not limited to these examples without departing from the scope of the invention.

EXAMPLE 1

(1) Synthesis of the organomagnesium compounds

In a 500-ml four-necked flask equipped with a stirrer, reflux condenser and dropping funnel, was placed 16.0 g of magnesium chip for Grignard reagent. The air and moisture in the flask were completely removed by replacing them with nitrogen gas.

In the dropping funnel, were placed 0.65 mol of n-butyl chloride and 300 ml of ethyl ether, and about 30 ml of the mixture was added dropwise to the magnesium in the flask to start reaction (when the reaction does not start, the bottom of the flask is heated slightly). After beginning of the reaction, the dropping was controlled so as to allow the reaction to proceed mildly. After completion of the dropping, the reaction was further continued under reflux for about 1 hour. Thereafter, the reaction solution was cooled to room temperature and the unreacted magnesium was filtered off with a glass filter.

The concentration of the organomagnesium compound in ethyl ether was quantitatively determined by hydrolyzing the compound with 1-N sulfuric acid and back-titrating with 1-N sodium hydroxide solution using phenolphthalein as an indicator. The concentration was 2.00 m mol/ml.

This synthetic method is also applicable to the synthesis of other organomagnesium compounds.

(2) Synthesis of the catalysts

The air and moisture in a 100-ml four-necked flask equipped with a stirrer, dropping funnel and thermometer were sufficiently removed by replacing them with nitrogen gas.

2.65 g of anhydrous aluminum chloride purified by sublimation was placed in the flask and dissolved in 30 ml of ethyl ether while being cooled with ice. Thereafter, 10 ml of the ether solution containing 20.0 m mol of n-butylmagnesium chloride synthesized in (1) was gradually added dropwise from the dropping funnel to produce a white precipitate. The reaction was carried out for 1 hour with ice-cooling and then at the boiling point of ethyl ether for 1 hour. After the reaction, the ethyl ether was removed and the residue was washed with ethyl ether, filtered and dried to obtain 5.2 g of a white solid. This white solid contained 9.5% by weight of magnesium, 4.2% by weight of aluminum and 42.2% by weight of chloride.

1.5 g of the white solid was placed in the 100-ml four-necked flask and impregnated with 10 ml of titanium tetrachloride. The mixture was reacted at 130° C. for 1 hour with heating. After completion of the reaction, the reaction mixture was repeatedly washed with n-heptane until the presence of titanium tetrachloride was no longer observable in the washing liquors. The solid product obtained was dried and analyzed. It was found that the amount of titanium supported was 58 mg per 1 g of the solid product.

This synthetic method is also applicable to the synthesis of other catalysts.

(3) Polymerization

The atmosphere in a 1-liter stainless steel autoclave equipped with an electromagnetic induction stirrer was sufficiently replaced with nitrogen gas and the autoclave was heated to 90° C. To the autoclave were added 500 ml of n-heptane which was sufficiently dehydrated and deoxidated, 2.5 m mol of triethylaluminum and 12.3 mg of the aforesaid solid with stirring. Hydrogen gas was charged in the autoclave until a pressure gauge showed 5 kg/cm$^2$ and then ethylene gas was charged until the pressure gauge showed 15 kg/cm$^2$. Thus the reaction was started. The polymerization was carried out at 90° C. for 1 hour during which the pressure in the autoclave was kept at 15 kg/cm$^2$ by supplying ethylene gas.

After completion of the polymerization, the resultant polymer was filtered, washed with n-heptane and dried at 60° C. under reduced pressure to obtain 148 g of polyethylene. The polyethylene had a melt index of 0.38. In this reaction, the catalytic activity was 1,210 g polyethylene/g solid.hr.C$_2$H$_4$ pressure and 20,800 g polyethylene/g Ti.hr.C$_2$H$_4$ pressure (converted to Ti basis).

EXAMPLES 2 TO 7

The preparation of catalyst and the polymerization were carried out according to the method in Example 1. The results obtained are shown in Table 1.

Table 1

| | Preparation of catalyst | | | | |
|---|---|---|---|---|---|
| | [A] $R_nAlX_{3-n}$ or $R'_mSiX_{4-m}$ | [B] Organomagnesium compound | Solvent | Ti— or V— compound | Amount of Ti or V supported (weight %) |
| Example 2 | SiCl$_4$ 15.0 m mol | n-BuMgCl 15.0 m mol | Et$_2$O | TiCl$_4$ 10 ml | 6.8 |
| Example 3 | AlCl$_3$ + SiCl$_4$ 7.2 m mol + 7.0 m mol | n-BuMgCl 14.0 m mol | i-Am$_2$O | TiCl$_4$ 10 ml | 7.0 |
| Example 4 | n-BuAlCl$_2$ 20 m mol | n-BuMgCl 20 m mol | (n-Bu)$_2$O | TiCl$_4$ 10 ml | 6.3 |
| Example 5 | Et$_3$Al$_2$Cl$_3$ 18.0 m mol | EtMgCl 20.0 m mol | THF | VCCl$_3$ 10 ml | 8.3 |
| Example 6 | MeSiCl$_3$ 17.0 m mol | i-PrMgCl 15.0 m mol | dioxane | Ti(OEt)$_2$.Cl$_2$ 10 ml | 6.5 |
| Example 7 | AlCl$_3$ 15.0 m mol | n-BuMgBr 15.0 m mol | Et$_2$O | TiCl$_4$ 10 ml | 7.3 |

Note 1: The polymerization conditions were the same as in Example 1 (organoaluminum compound 2.5 m mol, hydrogen 5 kg/cm$^2$, ethylene 10 kg/cm$^2$, polymerization temperature 90° C., polymerization time 1 hr).
Note 2: The preparation of catalyst was the same as in Example 1.
Note 3: In the molecular formulae in the table, Me means a methyl group, Et an ethyl group, i-Pr an iso-propyl group, n-Bu a n-butyl group, and i-Am an iso-amyl group.

| | | | Polymerization conditions and results | | |
|---|---|---|---|---|---|
| | | | Catalytic activity | | |
| Amount of solid catalyst used (mg) | Organoaluminum compound | Yield (g) | g polyethylene/ g solid . hr . C$_2$H$_4$ pressure | g polyethylene/ g Ti . hr . C$_2$H$_4$ pressure | Melt index g/10 min |
| 7.2 | Et$_3$Al | 90 | 1,250 | 18,400 | 0.72 |
| 10.2 | Et$_3$Al | 138 | 1,350 | 19,300 | 0.81 |
| 8.0 | (n-Bu)$_3$Al | 89 | 1,110 | 17,600 | 0.45 |
| 10.7 | Et$_2$AlCl | 102 | 950 | 11,400 | 0.50 |
| 13.3 | Et$_3$Al | 130 | 980 | 15,100 | 0.85 |
| 8.5 | Et$_3$Al | 88 | 1,035 | 14,180 | 0.53 |

EXAMPLE 8

The air and moisture in a 100-ml four-necked flask equipped with a stirrer, dropping funnel and thermometer was sufficiently removed by replacing them with nitrogen gas. To the flask were added 2.0 g of magnesium hydroxide, which had been sufficiently dehydrated and dried at 150° C. under reduced pressure, and 30 ml of ethyl ether at room temperature. Thereafter, 17 ml of the ether solution containing 34.0 m mol of n-butylmagnesium chloride, which had been synthesized in Example 1, was gradually added dropwise from the dropping funnel, while the mixture in the flask was continued to stir.

After the reaction was carried out for 1 hour with stirring, an ether solution containing 4.5 g of purified anhydrous aluminum chloride was gradually added dropwise thereto with ice-cooling. The reaction was carried out for 1 hour with ice-cooling and then at the boiling point of ethyl ether for 1 hour. After completion of the reaction, the ethyl ether was removed and the residue was washed with ethyl ether, filtered and dried to obtain 6.8 g of a white solid. This white solid contained 20.7% by weight of magnesium, 2.8% by weight of aluminum and 40.5% by weight of chlorine.

1.5 g of the white solid was placed in the 100-ml four-necked flask and impregnated with 30 ml of titanium tetrachloride. The mixture was reacted at 130° C. for 1 hour with heating. After completion of the reaction, the reaction mixture was repeatedly washed with n-heptane until the presence of titanium tetrachloride was no longer observable in the washing liquors. The solid product was dried and analyzed. It was found that the amount of titanium supported for 47 mg per 1 g of the solid product.

The polymerization was carried out according to the method in Example 1 using 9.2 mg of the catalyst obtained. Thus, 117 g of polyethylene was obtained. This polyethylene had a melt index of 0.78. In this reaction, the catalytic activity was 1,270 g polyethylene/g solid.hr.$C_2H_4$ pressure and 27,000 g polyethylene/g Ti.hr.$C_2H_4$ pressure (converted to Ti basis).

EXAMPLES 9 to 13

The preparation of catalyst and the polymerization were carried out according to the method in Example 8. The results obtained are shown in Table 2.

Table 2

| | Preparation of catalyst | | | | | |
|---|---|---|---|---|---|---|
| | [A]<br>Hydroxide | [B]<br>Organomagnesium<br>compound | [C]<br>$R_nAlX_{3-n}$ | [A] + [B] + [C]<br>Solvent | Ti— or V—<br>compound | Amount of<br>Ti or V<br>supported<br>(weight %) |
| Example 9 | Ca(OH)$_2$<br>20.0 m mol | EtMgCl<br>21.0 m mol | AlCl$_3$<br>25.0 m mol | Et$_2$O | TiCl$_4$<br>10 ml | 5.3 |
| Example 10 | Zn(OH)$_2$<br>25.5 m mol | i-PrMgCl<br>25.0 m mol | AlCl$_3$<br>25.0 m mol | (i-Pr)$_2$O | TiCl$_4$<br>10 ml | 4.8 |
| Example 11 | Al(OH)$_3$<br>20.0 m mol | n-BuMgCl<br>20.0 m mol | AlCl$_3$<br>24.0 m mol | (i-Am)$_2$O | TiCl$_4$<br>10 ml | 5.1 |
| Example 12 | Mg(OH)$_2$<br>34.5 m mol | n-BuMgCl<br>50.0 m mol | EtAlCl$_2$<br>48.0 m mol | Et$_2$O | VCCl$_3$<br>10 ml | 7.3 |
| Example 13 | Mg(OH)Cl<br>18.5 m mol | EtMgCl<br>35.0 m mol | (n-Bu)$_2$.AlCl<br>34.0 m mol | THF | Ti(OEt)$_2$.Cl$_2$<br>10 ml | 6.0 |

| | | Polymerization conditions and results | | |
|---|---|---|---|---|
| | | Catalytic activity | | |
| Amount of<br>solid catalyst<br>used (mg) | Organoaluminum<br>compound | g polyethylene/<br>g solid . hr . $C_2H_4$<br>pressure | g polyethylene/<br>g Ti . hr . $C_2H_4$<br>pressure | Melt index<br>g/10 min |
| 9.5 | E$_3$Al | 1,240 | 23,400 | 0.90 |
| 10.0 | (n-Bu)$_3$Al | 1,080 | 22,600 | 0.81 |
| 8.8 | Et$_3$Al | 1,280 | 25,100 | 0.85 |
| 10.5 | Et$_2$AlCl | 920 | 12,600 | 0.51 |
| 9.2 | Et$_3$Al | 1,300 | 21,700 | 0.75 |

EXAMPLE 14

The air and moisture in a 100-ml four-necked flask equipped with a stirrer, dropping funnel and thermometer was sufficiently removed by replacing them with nitrogen gas. To the flask were added 2.0 g of magnesium hydroxide, which had been sufficiently dehydrated and dried at 150° C. under reduced pressure, and 30 ml of ethyl ether at room temperature. Thereafter, 17 ml of the ether solution containing 34.0 m mol of n-butylmagnesium chloride, which had been synthesized in Example 1, was gradually added dropwise from the dropping funnel, while the mixture in the flask was continued to stir. After the reaction was carried out for 1 hour with stirring, 35.0 m mol of silicon tetrachloride was gradually added dropwise with ice-cooling. The reaction was carried out for 1 hour with ice-cooling and then at the boiling point of ethyl ether for 1 hour. After completion of the reaction, the ethyl ether was removed and the residue was washed with ethyl ether, filtered and dried to obtain 6.0 g of a white solid. This white solid contained 21.5% by weight of magnesium, 1.8% by weight of silicon and 38.7% by weight of chlorine.

1.5 g of the white solid was placed in the 100-ml four-necked flask and impregnated with 30 ml of titanium tetrachloride. The mixture was reacted at 130° C. for 1 hour with heating. After completion of the reaction mixture was repeatedly washed with n-heptane until the presence of titanium tetrachloride was no longer observable in the washing liquors. The solid product was dried and analyzed. It was found that the amount of titanium supported was 51 mg per 1 g of the solid product.

The polymerization was carried out according to the method in Example 1 using 8.0 mg of the catalyst obtained. Thus, 104 g of polyethylene was obtained. The polyethylene had a melt index of 0.62. In this reaction, the catalytic activity was 1,300 g polyethylene/g solid.hr.C₂H₄ pressure and 25,500 g polyethylene/g Ti.hr.C₂H₄ pressure (converted to Ti basis).

EXAMPLES 15 TO 19

The preparation of catalyst and the polymerization were carried out according to the method in Example 14. The results obtained are shown in Table 3.

was 110 g polyethylene/g solid.hr.C$_2$H$_4$ pressure and 1,410 g polyethylene/g Ti.hr.C$_2$H$_4$ pressure (converted to ti basis).

REFERENCE EXAMPLE 3

Titanium tetrachloride was supported on the solid carrier which was a reaction product resulting from 2.0 g of aluminum hydroxide and 25.0 m mol of n-butyl-

Table 13

Preparation of catalyst

| | [A] Hydroxide | [B] Organomagnesium compound | [C] R'$_m$SiX$_{4-m}$ | [A] + [B] + [C] Solvent | Ti— or V— compound | Amount of Ti or V supported (weight %) |
|---|---|---|---|---|---|---|
| Example 15 | Ca(OH)$_2$ 24.8 m mol | EtMgCl 25.0 m mol | SiCl$_4$ 25.0 m mol | Et$_2$O | TiCl$_4$ 10 ml | 4.5 |
| Example 16 | Zn(OH)$_2$ 18.2 m mol | i-PrMgCl 21.0 m mol | SiCl$_4$ 20.5 m mol | Et$_2$O | TiCl$_4$ 10 ml | 6.1 |
| Example 17 | Al(OH)$_3$ 35.0 m mol | n-BuMgCl 50.0 m mol | SiCl$_4$ 48.0 m mol | (i-Am)$_2$O | TiCl$_4$ 10 ml | 5.6 |
| Example 18 | Mg(OH)$_2$ 20.0 m mol | n-BuMgCl 35.0 m mol | CH$_3$SiCl$_3$ 35.0 m mol | (i-Pr)$_2$O | VOCl$_3$ 10 ml | 7.6 |
| Example 19 | Mg(OH)Cl 18.5 m mol | n-BuMgCl 20.0 m mol | C$_6$H$_5$SiCl$_3$ 21.0 m mol | THF | Ti(OEt)$_2$ · Cl$_2$ 10 ml | 4.6 |
| Example 20 | Al(OH)$_3$ 20.0 m mol | EtMgBr 21.0 m mol | SiCl$_4$ 20.0 m mol |  | TiCl$_4$ 10 ml | 5.7 |

Polymerization conditions and results

| Amount of solid catalyst used (mg) | Organoaluminum compound | Catalyst activity g polyethylene/ g solid . hr . C$_2$H$_4$ pressure | Catalyst activity g polyethylene/ g Ti . hr . C$_2$H$_4$ pressure | Melt index g/10 min |
|---|---|---|---|---|
| 9.6 | Et$_3$Al | 1,050 | 23,330 | 0.83 |
| 10.2 | (n-Bu)$_3$Al | 1,280 | 21,000 | 0.78 |
| 8.6 | Et$_3$Al | 1,370 | 24,500 | 0.81 |
| 10.2 | Et$_2$AlCl | 1,010 | 13,300 | 0.43 |
| 10.5 | Et$_3$Al | 1,040 | 22,600 | 0.66 |
| 9.2 | Et$_3$Al | 1,080 | 18,950 | 0.59 |

REFERENCE EXAMPLE 1

A mixture of 3.0 g of anhydrous magnesium chloride and 30 ml of ethyl ether was reacted for 1.0 hour at the boiling point. Thereafter, the ether was removed and the residue was calcined at 300° C. for 3.0 hours under reduced pressure to obtain a solid carrier. Next, a catalyst for polymerization, titanium tetrachloride supported on the solid carrier (the catalyst contained titanium of 23 mg per gram of the catalyst), was prepared.

The polymerization was carried out in the same manner as in Example 1 except that 18.5 mg of this catalyst was used. Thus, 16 g of polyethylene having a melt index of 0.33 was obtained. In this reaction, the catalytic activity was 86 g polyethylene/g solid.hr.C$_2$H$_4$ pressure and 3,740 g polyethylene/g Ti.hr.C$_2$H$_4$ pressure (converted to Ti basis).

REFERENCE EXAMPLE 2

The polymerization was carried out in the same manner as in Example 1 except that 20.8 mg of the catalyst prepared by the following method was used: In the same synthetic method of catalyst as in Example 8 except that aluminum chloride was not used, titanium tetrachloride was supported on the solid carrier which was a reaction product resulting from magnesium hydroxide and n-butylmagnesium chloride (the catalyst contained titanium of 78 mg per gram of the catalyst). Thus, 23 g of polyethylene having a melting index of 0.25 was obtained. In this reaction, the catalytic activity magnesium chloride (the ctalyst contained titanium of 85 mg per gram of the catalyst).

The polymerization was carried out in the same manner as in Example 1 except that 18.7 mg of the aforesaid catalyst was used. Thus, 25 g of polyethylene having a melt index of 0.31 was obtained. In this reaction, the catalytic activity was 134 g polyethylene/g solid.hr.C$_2$H$_4$ pressure and 1,580 g polyethylene/g Ti.hr.C$_2$H$_4$ pressure (converted to Ti basis).

It is apparent from these results that the catalysts of the present invention have extremely high activity.

EXAMPLE 21

The polymerization was carried out in the same manner as in Example 1 except that the amount of the solid (catalyst) was 11.8 mg and that 5.0 g of propylene was added. Thus, 142 g of polyethylene having a melt index of 0.54. The catalytic activity was 12,000 g polyethylene/g solid.hr. and 207,000 g polyethylene/g Ti.hr (converted to Ti basis).

The film of this polyethylene was measured for IR absorbance at 1,378 cm$^{-1}$. The number of methyl groups in the polyethylene was calculated by substituting the value of IR absorbance for log I$_o$/I in the following equation. As the result, it was found that the number of methyl group was 2.7 per 1,000 carbon atoms.

$$CH_3/1000C = 1/0.85 \times 1/d(cm) \times \log I_o/I$$

In the equation, d is a thickness of sample, I is an intensity of transmitted light, $I_o$ is an intensity of incident light and $CH_3/1000$ C means the number of methyl groups per 1000 atoms. The measurement of absorbance was carried out according to the compensating method by placing polyethylene film of which the value of $CH_3/1000$ C is substantially zero and the thickness is nearly the same as that of the sample film, in the compensation light-path.

EXAMPLES 22 and 23

The polymerization was carried out in the same manner as in Example 21. The results are shown in Table 4.

Table 4

| Example | Catalyst used | Catalytic activity g polyethylene/ g solid . hr | g polyethylene/ g Ti . hr | Melt index | Number of methyl groups/1000° C. |
|---|---|---|---|---|---|
| 22 | Catalyst in Example 8 8.8 mg | 11,900 | 253,500 | 0.87 | 3.0 |
| 23 | Catalyst in Example 14 9.1 mg | 11,700 | 230,000 | 0.95 | 3.6 |

EXAMPLE 24

The atmosphere in a 1-liter stainless steel autoclave equipped with an electromagnetic induction stirrer was sufficiently replaced with nitrogen gas. Thereafter, 500 ml of n-heptane which had been dehydrated and deoxidated, 2.5 m mol of triethylaluminum and 5.5 mg of the solid (catalyst) used in Example 1 were added to the autoclave.

The temperature of the system was elevated to 150° C., when the pressure in the autoclave showed a gauge pressure of 2 kg/cm$^2$ owing to the n-heptane vapor. Hydrogen gas was charged in the autoclave until a pressure gauge showed 3 kg/cm$^2$ and then ethylene gas was charged therein until the pressure gauge showed 15 kg/cm$^2$. Thus, the polymerization was started. The polymerization was carried out at 150° C. for 1 hour during which the pressure in the autoclave was kept at 15 kg/cm$^2$ by supplying ethylene gas. Thereafter, the procedure was carried out in the same manner as in Example 1 to obtain 70 g of polyethylene having a melt index of 0.88. In this reaction, the catalytic activity was 1,060 g polyethylene/g solid. hr.C$_2$H$_4$ pressure and 18,300 g polyethylene/g Ti.hr.C$_2$H$_4$ pressure (converted to Ti basis).

It is apparent from the results that the catalyst of the present invention keeps a high catalytic activity even in the solution polymerization at high temperatures.

EXAMPLE 25

The atomsphere in a 1-liter stainless steel autoclave equipped with an electromagnetic induction stirrer was sufficiently replaced with nitrogen gas. Thereafter, 500 ml of n-heptane which had been dehydrated and deoxidated, 2.5 m mol of triethylaluminum and 10.4 mg of the solid (catalyst) used in Example 1 were added to the autoclave.

The temperature of the system was elevated to 130° C., when the pressure in the autoclave showed a gauge pressure of 1.5 kg/cm$^2$ owing to the n-heptane vapor. An ethylene-propylene mixed gas containing 50 mole % of propylene was charged therein in place of ethylene until a pressure gauge showed 10 kg/cm$^2$. Thereafter, the polymerization was carried out at 130° C. for 1 hour during which the pressure in the autoclave was kept at 10 kg/cm$^2$ by continuously supplying the mixed gas.

As the results, 33.5 g of ethylene-propylene copolymer having a melt index of 0.26 and a propylene content of 21.5 mole % was obtained. In this reaction, the catalytic activity was 3,220 g polymer/g solid.hr and 55,700 g polymer/g Ti.hr (converted to Ti basis).

EXAMPLE 26

The atmosphere in a 1-liter stainless steel autoclave equipped with an electromagnetic induction stirrer was sufficiently replaced with nitrogen gas. Thereafter, 28.5 mg of the solid (catalyst) used in Example 1, 5.0 m mol of triethylaluminum and 300 g of liquid propylene were charged therein and polymerization was carried out at 60° C. for 1 hour.

After completion of the polymerization, unreacted propylene was purged and the reaction product was taken out and dried at 60° C. under reduced pressure to obtain 98 g of polypropylene. This polypropylene had a boiling heptane-insoluble part of 56.6%.

In this reaction, the catalytic activity was 3,440 g polypropylene/g solid.hr and 59,310 g polypropylene/g Ti.hr (converted to Ti basis).

EXAMPLES 27 to 32

The polymerization of propylene was carried out in the same manner as in Example 26. The results obtained are shown in Table 5.

Table 5

| | Preparation of catalyst | | | | | |
|---|---|---|---|---|---|---|
| | [A] Hydroxide | [B] Organomagnesium compound | [C] $R_nAlX_{3-n}$ or $R'_mSiX_{4-m}$ | [A] + [B] + [C] Solvent | Ti— or V— compound | Amount of Ti or V supported (weight %) |
| Example 27 | — | n-BuMgCl 20.0 m mol | AlCl$_3$ 20.0 m mol | (i-Am)$_2$O | TiCl$_4$ 10 ml | 2.4 |
| Example 28 | — | i-PrMgBr 25.0 m mol | SiCl$_4$ 24.8 m mol | Et$_2$O | TiCl$_4$ 10 ml | 5.4 |
| Example 29 | — | EtMgI 26.5 m mol | EtAlCl$_2$ 26.0 m mol | THF | TiCl$_4$ 10 ml | 7.0 |
| Example 30 | Mg(OH)$_2$ | EtMgCl | AlCl$_3$ | (i-Am)$_2$O | TiCl$_4$ | 5.4 |

Table 5-continued

| | | | | | | |
|---|---|---|---|---|---|---|
| Example 31 | 15.0 m mol<br>Al(OH)₃<br>20.0 m mol | 15.0 m mol<br>n-BuMgCl<br>20.0 m mol | 15.0 m mol<br>SiCl₄<br>20.0 m mol | (n-Bu)₂O | 10 ml<br>TiCl₄<br>10 ml | 6.2 |
| Example 32 | Zn(OH)₂<br>15.0 m mol | n-BuMgBr<br>30.0 m mol | AlCl₃<br>15.0 m mol | Et₂O | TiCl₄<br>10 ml | 5.7 |

| Polymerization results | | |
|---|---|---|
| g polypropylene/<br>g solid . hr | g polypropylene/<br>g Ti . hr | Boiling n-heptane-<br>insoluble part (%) |
| 5,250 | 218,750 | 53.8 |
| 2,850 | 52,780 | 51.0 |
| 2,560 | 36,570 | 42.7 |
| 3,170 | 58,700 | 45.5 |
| 2,860 | 46,130 | 44.0 |
| 2,360 | 41,400 | 47.3 |

REFERENCE EXAMPLE 4

The polymerization of propylene was carried out in the same manner as in Example 26 except that 52.3 mg of the catalyst used in Reference Example 1, titanium tetrachloride supported on anhydrous magnesium chloride, was used. Thus, 6.7 g of polypropylene was obtained. This polypropylene had a boiling n-heptane-insoluble part of 40.7%. In this reaction, the catalytic activity was 128 g polypropylene/g solid.hr and 5,565 g polypropylene/g Ti.hr (converted to Ti basis).

It is apparent from the results that the catalysts of the present invention have extremely high activity even in the polymerization of propylene.

EXAMPLES 33 to 37

The polymerization was carried out in the same manner as in Example 26 except that the electron donor compound as shown in Table 6, as third component of the catalyst, was used. The results obtained are shown in Table 6.

Table 6

| Example | Electron donor compound | Amount used (m mole) | Catalytic activity | | Boiling n-heptane insoluble part (%) |
|---|---|---|---|---|---|
| | | | g polypropylene/<br>g solid . hr | g polypropylene/<br>g Ti . hr | |
| 33 | Iso-amyl ether | 2.5 | 1,270 | 21,900 | 82.8 |
| 34 | Dioxane | 0.5 | 3,380 | 58,275 | 68.5 |
| 35 | Tetrahydrofuran | 2.5 | 3,060 | 52,760 | 78.7 |
| 36 | Acetone | 2.5 | 2,730 | 47,070 | 90.2 |
| 37 | Hexamethyl phosphoric triamide (HMPA) | 2.5 | 2,810 | 48,450 | 85.0 |

What is claimed is:

1. A process for the preparation of a solid catalyst component for olefin polymerization, which comprises
   (1) (a) reacting an organomagnesium compound represented by the formula, $R^1MgX$ and/or $(R^1)_2Mg$, wherein $R^1$ is an alkyl group having 1 to 20 carbon atoms, aryl or alkenyl group and X is a halogen atom, with an aluminum halogenide and/or silicon halogenide in an ethereal solvent at a temperature of $-20°$ to $200°$ C., the molar ratio of said organomagnesium compound to said halogenide being 0.1:1 to 10:1, or
   (1) (b) reacting an organomagnesium compound represented by the formula $R^1MgX$ and/or $(R^1)_2Mg$, wherein $R^1$ and X are as defined above, with at least one hydroxide selected from the group consisting of magnesium hydroxide, calcium hydroxide, zinc hydroxide, and aluminum hydroxide in an ethereal solvent at a temperature of $-20°$ to $200°$ C., the molar ratio of said organomagnesium compound to said hydroxide compound being 1:0.01 to 1:10, and reacting a reaction mixture thus obtained with an aluminum halogenide and/or silicon halogenide being in an ethereal solvent at a temperature of $-20°$ to $200°$ C., the molar ratio of the organomagnesium compound to said halogenide being 0.1:1 to 10:1,
   (2) filtering and drying the resulting reaction products thereby to obtain a solid carrier containing the adsorbed ether compound,
   (3) supporting a titanium compound represented by the formula, $Ti(OR^5)_{4-p}X_p$, wherein $R^5$ is an alkyl group having 1 to 20 carbon atoms, cycloalkyl or phenyl group, X is a halogen atom and p is a number satisfying the formula, $0 \leq p \leq 4$, and/or a compound selected from the group consisting of vanadium tetrachloride, and oxyvanadium trichloride on said carrier at a temperature of $-20°$ to $150°$ C., wherein the amount of said titanium and/or vanadium compound supported on said carrier is 0.01 to 30% by weight in terms of titanium and/or vanadium based on the total amount of the supported compound and the solid carrier.

2. A process according to claim 1, wherein said aluminum halogenide is represented by the formula, $(R^3)_nAlX_{3-n}$ wherein $R^3$ is an alkyl group having 1 to 20 carbon atoms, aryl or alkenyl group, X is a halogen atom and n is a number satisfying the formula, $0 \leq n < 3$.

3. A process according to claim 2, wherein said aluminum halogenide is aluminum chloride.

4. A process according to claim 1, wherein said silicon halogenide is represented by the formula, $(R^4)_mSiX_{4-m}$ wherein $R^4$ is an alkyl group having 1 to 20 carbon atoms, aryl or alkenyl group, X is a halogen atom and m is a number satisfying the formula, $0 \leq m < 4$.

5. A process according to claim 4, wherein said silicon halogenide in silicon tetrachloride.

6. A process according to claim 1, wherein said ethereal solvent is diethyl ether or isoamyl ether.

7. A process according to claim 1, wherein said molar ratio of the organomagnesium compound to the hydroxide is within the range of 1/0.1 to 1/1.

8. A process according to claim 1, wherein said molar ratio of the organomagnesium compound to the aluminum halogenide and/or silicon halogenide is within the range of 1/1 to 5/1.

9. A process according to claim 1, wherein said amount of the titanium compound and/or vanadium compounds supported on the solid carrier is 0.1 to 15% by weight interms of titanium and/or vanadium based on the total amount of the supported compound and the carrier.

10. A solid catalyst component obtained by the method of claim 1.

11. A process for producing olefin polymers, which comprises polymerizing an olefin in the presence of the solid catalyst component of claim 10 and an organoluminum compound.

* * * * *